United States Patent [19]

Jones, Jr.

[11] Patent Number: 5,210,962
[45] Date of Patent: May 18, 1993

[54] VERTICAL SHAFT PROCESSOR

[76] Inventor: John B. Jones, Jr., 12557 E. Kentucky Pl., Aurora, Colo. 80012

[21] Appl. No.: 759,462

[22] Filed: Sep. 13, 1991

[51] Int. Cl.⁵ .......................................... F26B 17/12
[52] U.S. Cl. ..................................... 34/168; 209/244
[58] Field of Search ............... 34/165, 168, 169, 170, 34/174, 181, 26, 27, 32, 167; 209/240, 244, 246

[56] References Cited

U.S. PATENT DOCUMENTS 4,903,414  2/1990  White et al. .......................... 34/60
4,974,336  12/1990  Hahn .................................. 34/32 X

*Primary Examiner*—Henry A. Bennett
*Attorney, Agent, or Firm*—Gary M. Polumbus

[57] ABSTRACT

A vertical shaft processor includes a feed zone utilizing a lock hopper for introducing particulate material to a treatment zone in charges while inhibiting the release of treating fluids from the vessel. A separator receives particulate material from the lock hopper and distributes it across the cross-section of the vessel so as to encourage a uniform cross-sectional flow of various sized particulate material through the treatment zone. Treating fluids are uniformly distributed into the treatment zone of the vessel beneath the separator and through not only linear but also arcuate distributor pipes so that the treating fluids are uniformly exposed to the particulate material across the cross-section of the vessel. A removal grate at the bottom of the vessel includes means for introducing additional treating fluids, which may be cooling fluids, to the particulate material and for removing the material through a central circular opening and an outer ring-like opening to obtain a substantially uniform cross-sectional flow of material from the vessel. A circular pusher bar is supported by circumferentially spaced power cylinders to simultaneously pull and push particulate material into the central and ring-like discharge openings with each cylinder being sequentially operated to obtain an optimal eccentric movement of the pusher bar.

48 Claims, 9 Drawing Sheets

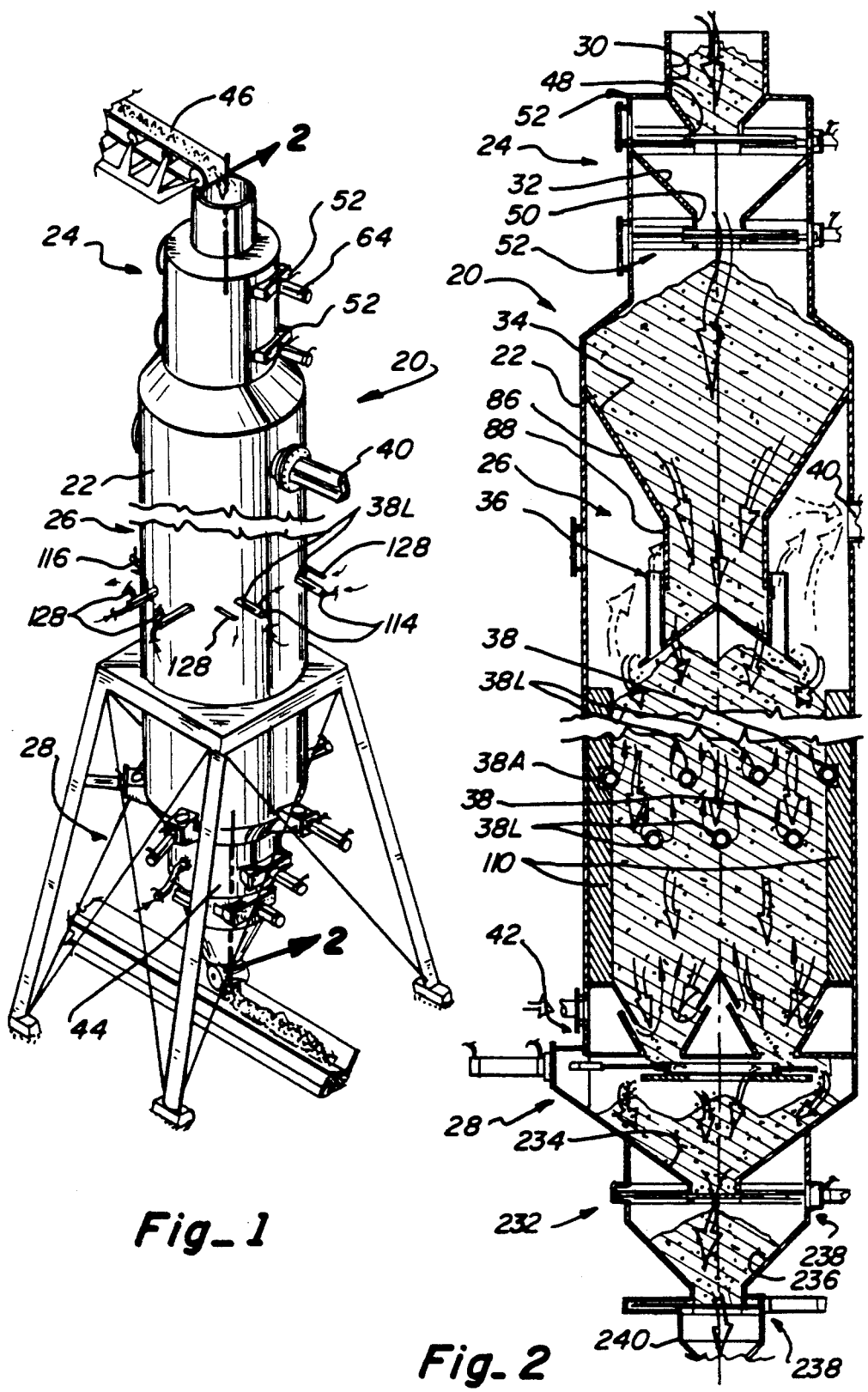
Fig_1
Fig_2

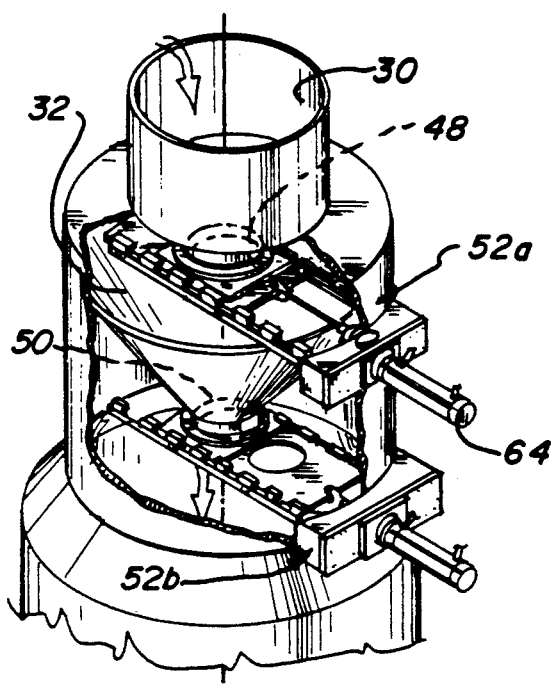
Fig_3
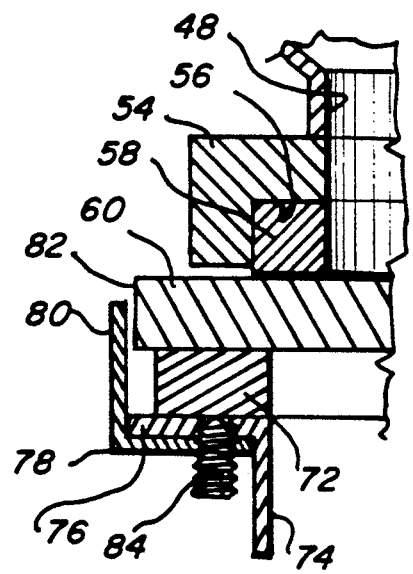
Fig_6
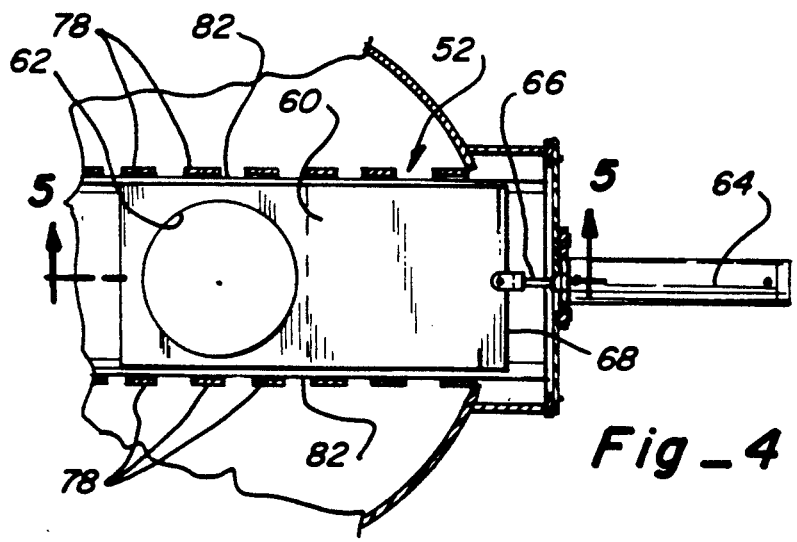
Fig_4
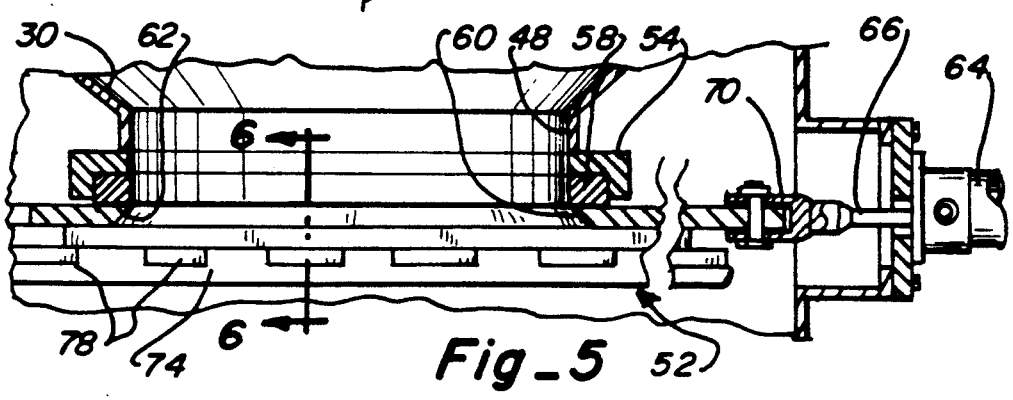
Fig_5

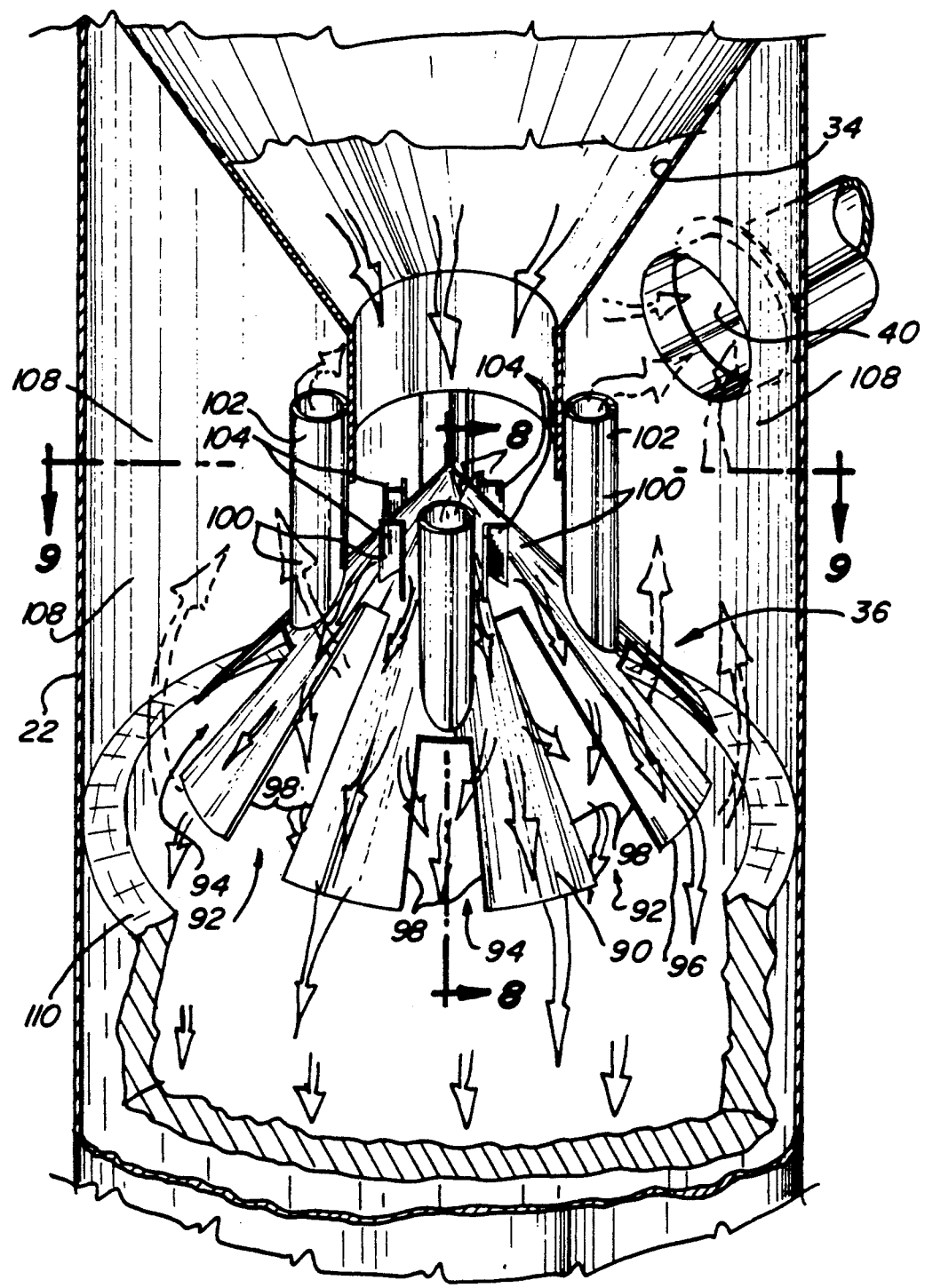
Fig_7

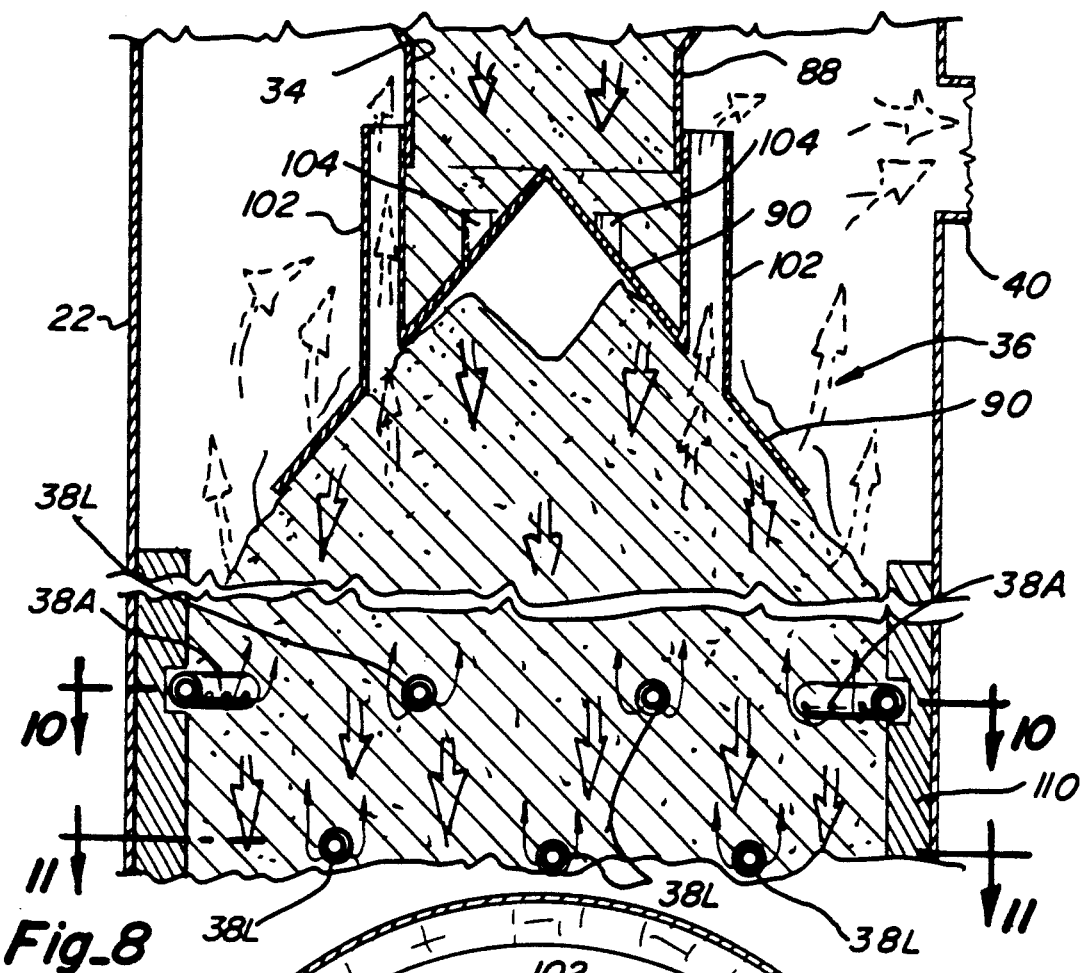
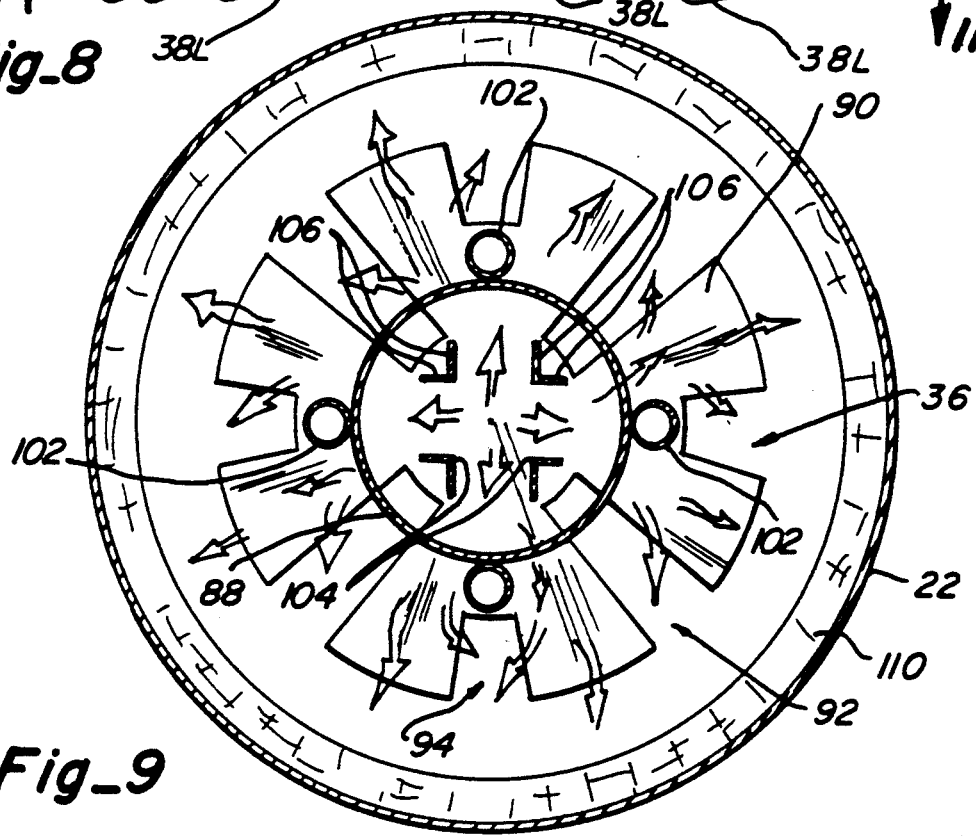

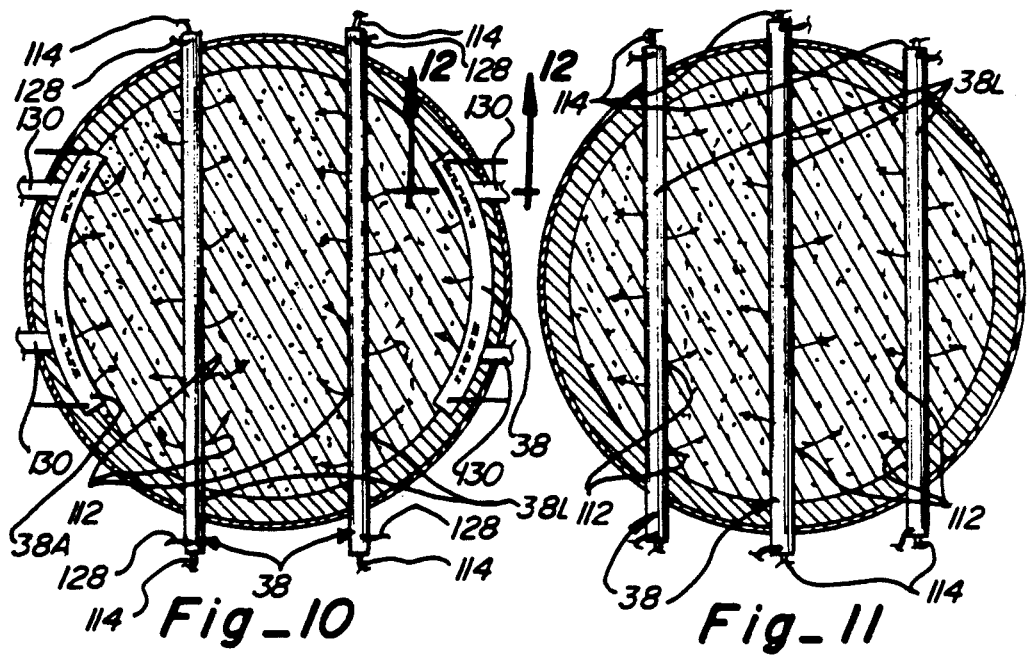
Fig_10   Fig_11
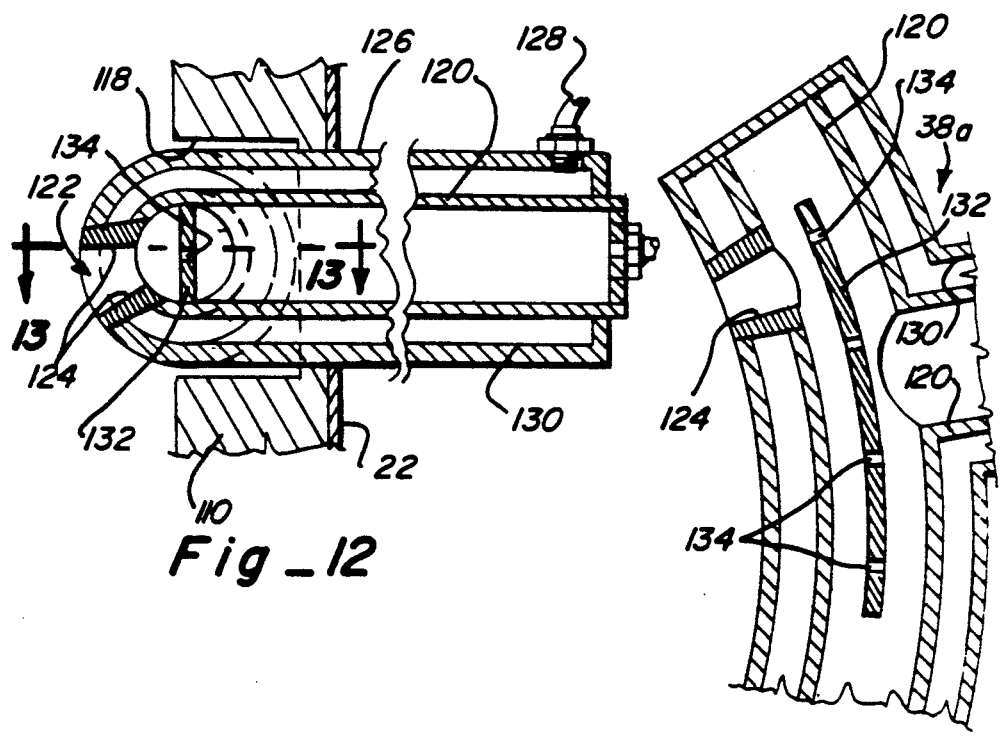
Fig_12   Fig_13

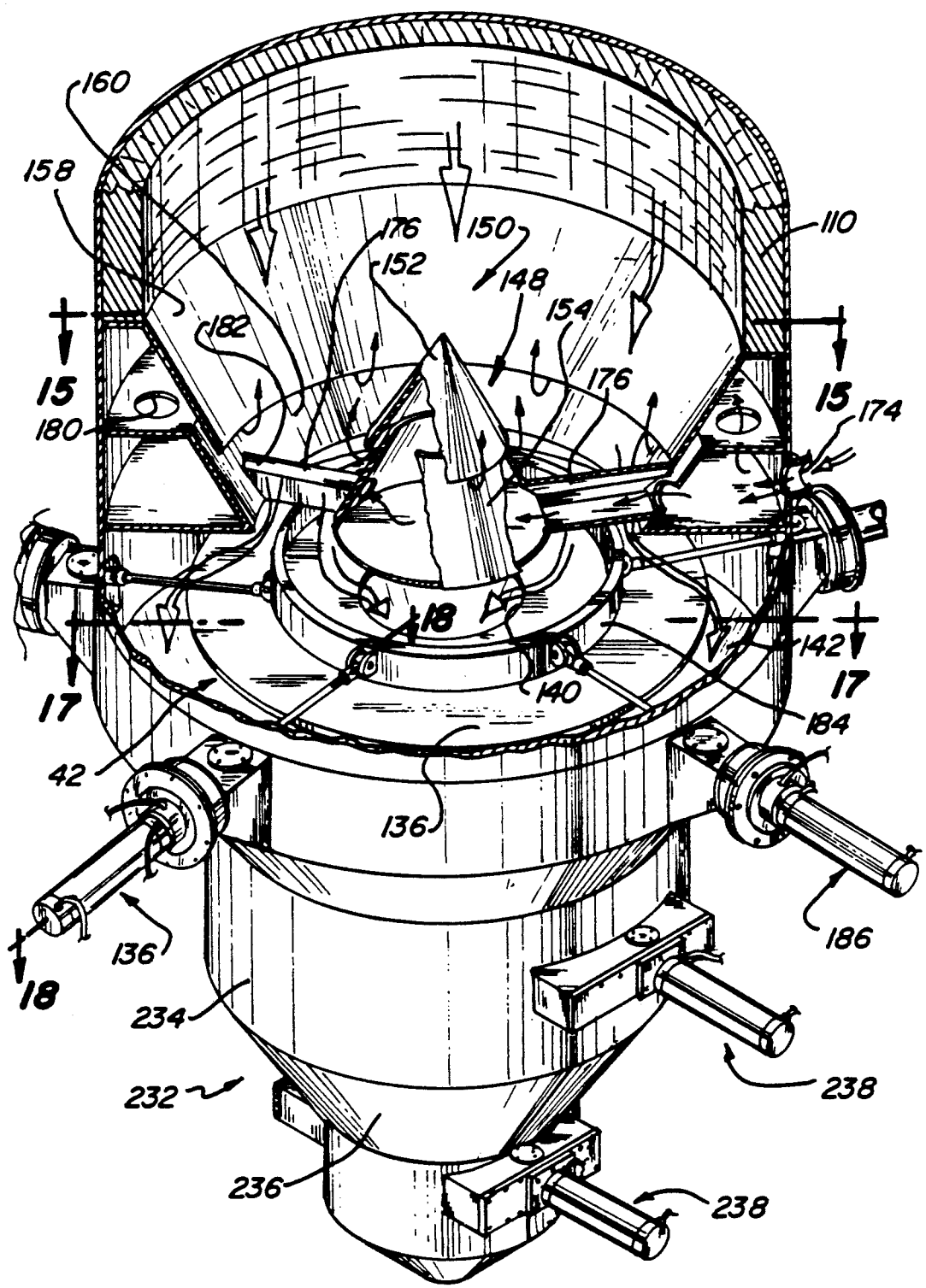
Fig_14

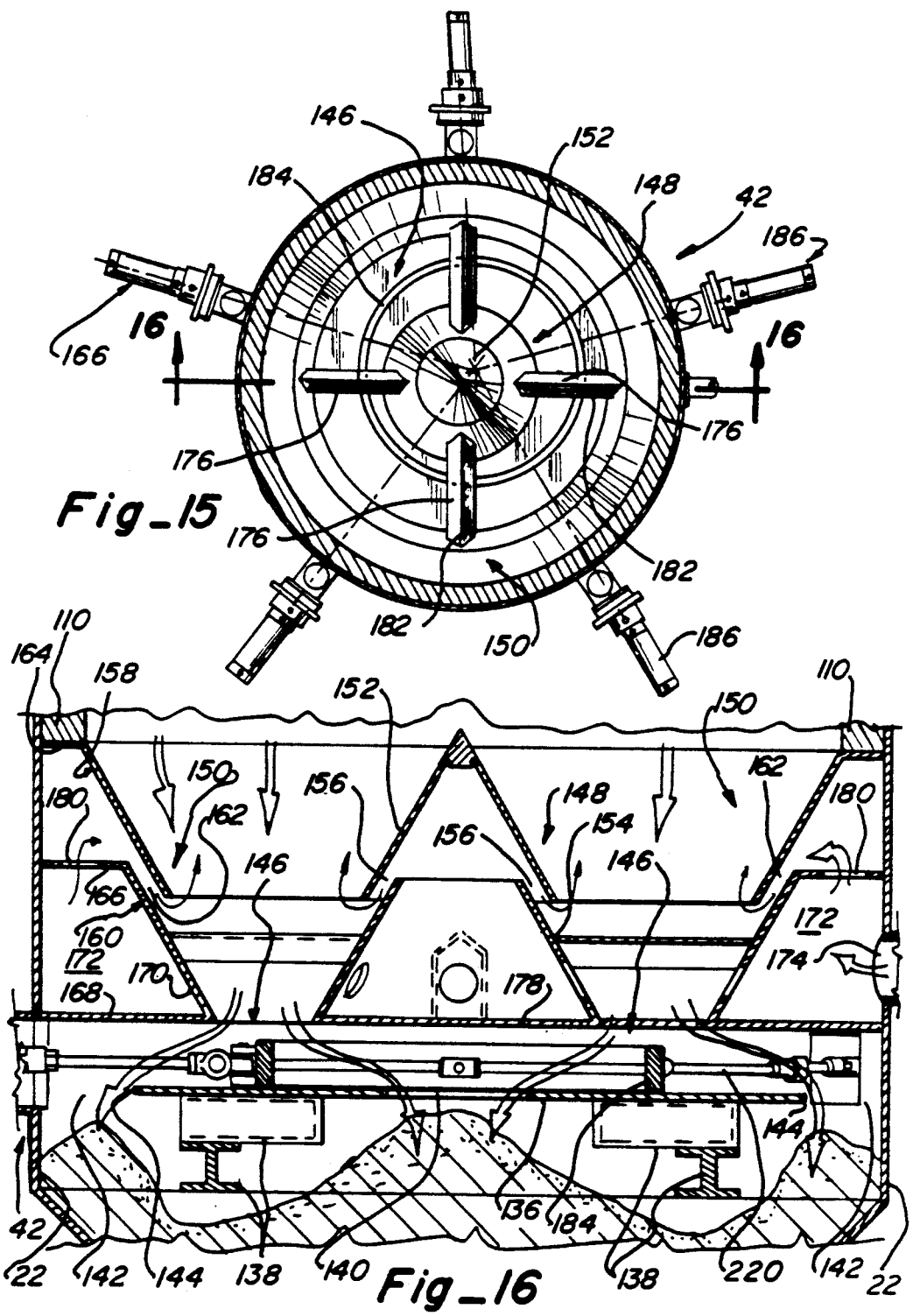

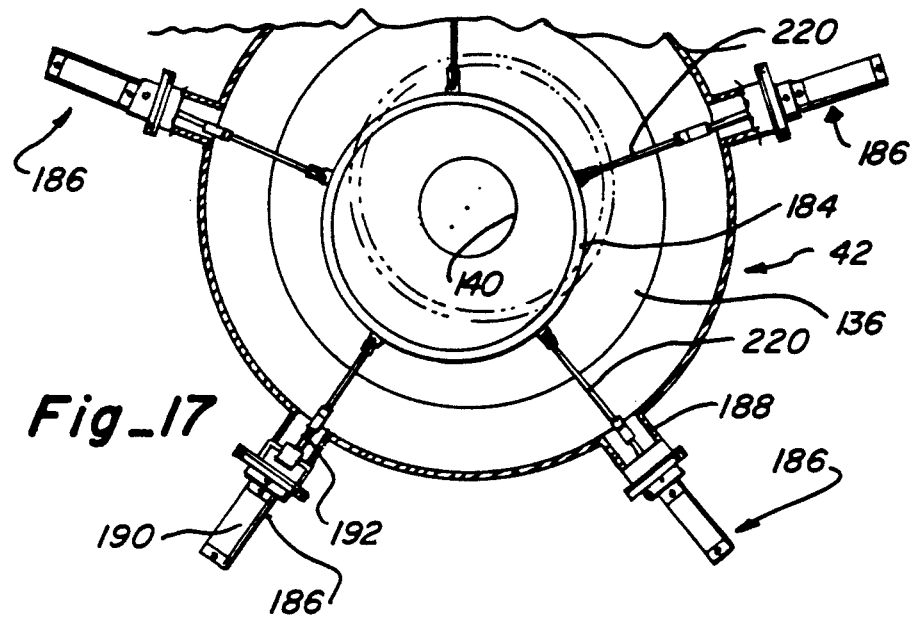
Fig_17
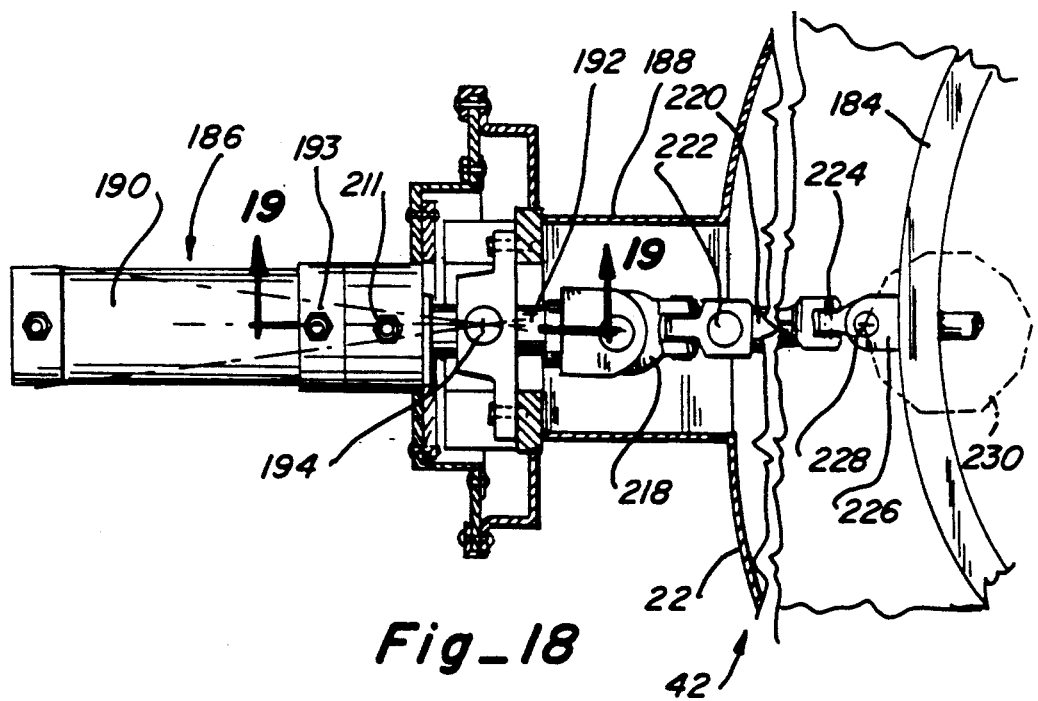
Fig_18

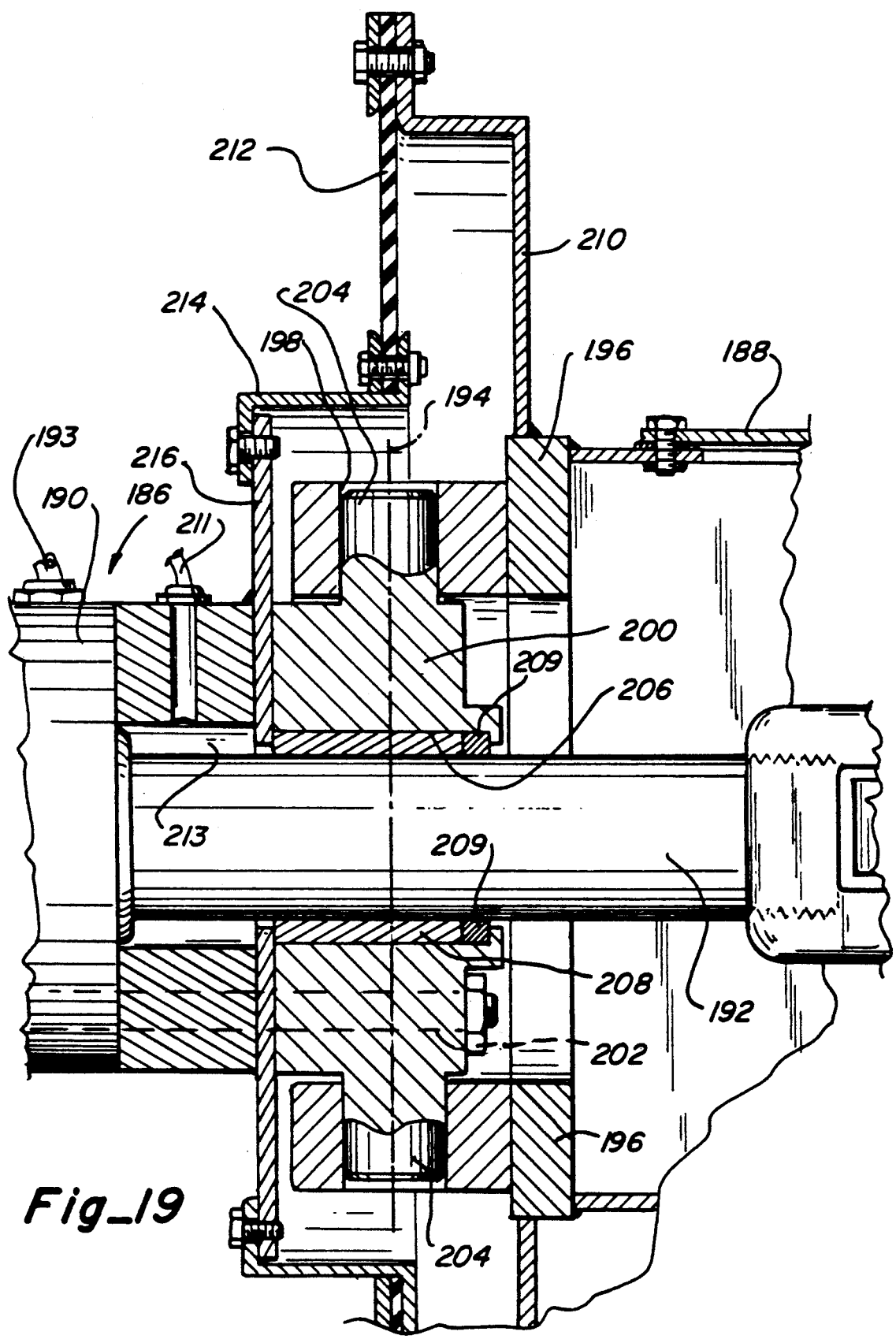
Fig_19

VERTICAL SHAFT PROCESSOR

BACKGROUND OF THE INVENTION

1. Field of the Invention

The present invention relates generally to vertical processing vessels which are commonly referred to as shaft or vertical kilns, shaft furnaces or shaft generators depending upon the process for which the vessel is being used and more particularly to a new and improved feed hopper, particle separator, fluid distributor and removal grate for use in such vessels.

2. Description of the Prior Art

A common form of processing equipment found in diverse industrial applications is a vertical vessel having a gravity flow of particulate solids from an upper feed to a lower discharge. Commonly, such vessels are called shaft or vertical kilns, shaft furnaces, shaft generators and the like depending upon the application and particular type of material being treated. Such vessels have been found useful for burning or calcining treatments such as the calcining of various types of materials to produce lime, coking coal, burning magnesite and/or dolomite, retorting oil shale, etc. Such vessels commonly include a vertical vessel shell, means for uniformly feeding granular or pulverulent material across the lateral extent of the vessel, a lower discharge means for providing a uniform discharge of the solid material from the vessel shell and some means for introducing treating fluids into the solids so that the solid material is treated in accordance with the pre-designed process. One of the major problems encountered in this type of vessel is the requirement for the uniform flow of solids across the lateral extent of the vessel from its top to its bottom so as to provide uniform treatment of all the solid particles passing through the vessel. Another problem is the uniform lateral distribution of the treating fluid, again to provide uniform treatment of the particles passing through the vessel.

In order to accommodate the above problems, many such vessels are rectangular in cross-section as it is easier to uniformly distribute fluids across a four-sided cross-section. Some vessels are circular in cross-section, but it is difficult to control uniform movement of the particulate material through the vessels as well as being difficult to control the uniform distribution of the treating fluids through the vessel.

The need to uniformly distribute the particles across the lateral cross-section of the vessel is important due to the fact that the material being processed typically is crushed and therefore is presented in a variety of sizes which are fed through the top of the vessel. The particles are typically centrally fed to the top of the vessel, and a certain amount of segregation automatically occurs with the larger particles usually migrating to the periphery of the vessel while the smaller particles concentrate near the center of the vessel. This is due to the natural angle of repose of the material as it accumulates in a feed hopper.

A similar situation typically arises with the counterflow of treating fluids as they will follow a path of least resistance which is naturally through the larger particles. Since the larger particles tend to congregate along the perimeter of the vessel, the counterflowing fluids tend to channel along the side walls so that a uniform exposure of the particulate matter to the treating fluids is difficult to obtain.

There are several features of a vessel that have an effect on the flow patterns of the particulate matter through the vessel as well as the treating fluids. As mentioned previously, as material is centrally deposited into a vessel, the larger particles tend to migrate radially outwardly at a faster rate than the smaller particles, and accordingly, systems have been developed for introducing the particulate matter to the vessel in a manner to avoid this known phenomenon of segregation. An example of such a system is disclosed in U.S. Pat. No. 3,071,230 issued to Brakel, et al. on Jan. 1, 1963. This patent uniformly distributes the inflowing particulate matter across the lateral cross-section of vessel to minimize the angle of repose problem.

It will also be appreciated that if the material is not removed from the bottom of the vessel in a substantially uniform cross-sectional manner, the flow rate of the particulate matter through the vessel will vary across the cross-section of the vessel. Accordingly, systems have been developed and employed for removing the particulate matter from the bottom of the vessel in as uniform a manner as possible, so as to maintain a uniform cross-sectional flow of the particulate matter through the vessel. Examples of such devices for regulating the uniform withdrawal of particulate material from the vessel are shown in my U.S. Pat. Nos. 3,401,922 issued Sept. 17, 1968, U.S. Pat. No. 3,373,982 issued Mar. 19, 1968 and U.S. Pat. No. 3,027,147 issued to Brakel, et al. on Mar. 27, 1962. These patents are each directed to grate systems for uniformly removing particulate matter from a cylindrical vessel.

As mentioned previously, it is very difficult in cylindrical vessels to uniformly distribute the treating fluids across the cross-section of the vessel since linear plenums which are typically used in vessels of rectangular cross-section do not uniformly distribute fluids across a circular cross-section. Accordingly, prior art cylindrical vessels have typically been inferior to rectangular vessels insofar as the application of treating fluids to the particulate matter.

Another prevalent problem in particle treating vessels resides in the fact that many times the treating fluids constitute gases which may be toxic or need to be confined for other reasons, and it is difficult to confine or eliminate the emission of such gases from a constant feed system where the particulate matter is fed into the top of a vessel.

It is to overcome the problems and shortcomings of the prior art that the present invention has been developed.

SUMMARY OF THE INVENTION

The vertical shaft processor of the present invention has been uniquely designed to not only move particulate material through a cylindrical vessel in a uniform cross-sectional flow but also expose the particulate material to treating fluids in a like manner so that uniform treatment of the material is effected across the entire cross-section. In order to accomplish this end, the vessel includes a unique feed system having a lock hopper so that the escape of treating fluids is minimized and an internal spreader that is uniquely designed to distribute various sized particulate matter in a predetermined pattern to obtain optimal uniform cross-sectional flow of the material through the vessel. The spreader also includes a system for channeling treating fluids that are counterflowing through the vessel to a collection system outside the vessel.

An important feature of the invention resides in the removal grate at the bottom of the vessel as it is imperative to the uniform cross-sectional flow of the particulate matter that it be withdrawn from the vessel in as uniform a cross-sectional manner as is possible. The grate system also includes a unique system for introducing treating fluids into the vessel, again in a relatively uniform cross-sectional manner.

At a location above the removal grate and below the particulate spreader, a fluid distributor system is incorporated into the vessel so that treating fluids can be introduced uniformly across the cross-section of the vessel even though the vessel is circular in cross-section. It will, therefore, be appreciated that treating fluids are introduced to the vessel at two vertically spaced locations thus providing means by which two different treating fluids or treating fluids at different temperatures can be introduced to the vessel if such were desirable for a particular process being carried out in the vessel. In other words, the vertical displacement of the locations for introducing treating fluids to the vessel actually provide optional treating zones when such are desirable.

As will be appreciated from the detailed description that follows, the various component parts of the vessel can be optionally and interchangeably used to obtain desired results in predetermined processes. By way of example, the feed system for the vessel which as mentioned previously inhibits the release of treating fluids from the vessel might also be incorporated beneath the removal grate so as to inhibit the removal of treating fluids through the bottom of the vessel.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is an isometric view of the vertical shaft processor of the present invention with an input conveyor and an output conveyor being disposed adjacent thereto.

FIG. 2 is an enlarged vertical section taken along line 2—2 of FIG. 1.

FIG. 3 is an enlarged fragmentary isometric view of the feed hopper portion of the vessel with parts broken away for clarity.

FIG. 4 is an enlarged horizontal section taken immediately above a slide valve shown in FIG. 3.

FIG. 5 is an enlarged vertical section taken along line 5—5 of FIG. 4.

FIG. 6 is a further enlarged section taken along line 6—6 of FIG. 5.

FIG. 7 is an enlarged partially sectioned isometric view illustrating the material separator of the vessel of FIG. 1 in relationship with the feed hopper.

FIG. 8 is a vertical section taken along line 8—8 of FIG. 7.

FIG. 9 is a horizontal section taken along line 9—9 of FIG. 7.

FIG. 10 is a reduced horizontal section taken along line 10—10 of FIG. 8.

FIG. 11 is a reduced horizontal section taken along line 11—11 of FIG. 8.

FIG. 12 is an enlarged vertical section taken along line 12—12 of FIG. 10.

FIG. 13 is a horizontal section taken along line 13—13 of FIG. 12.

FIG. 14 is a perspective view of the removal grate of the vessel shown in FIG. 1 with parts broken away for clarity.

FIG. 15 is a horizontal section taken along line 15—15 of FIG. 14.

FIG. 16 is a enlarged vertical section taken along line 16—16 of FIG. 15.

FIG. 17 is a horizontal section taken along line 17—17 of FIG. 14.

FIG. 18 is an enlarged vertical section taken along line 18—18 of FIG. 14.

FIG. 19 is an enlarged horizontal section taken along line 19—19 of FIG. 18.

DESCRIPTION OF THE PREFERRED EMBODIMENT

The vertical shaft processor 20 of the present invention, as seen in FIGS. 1 and 2, finds use in many fields of endeavor, and for purposes of the present invention, the various processes which may be practiced with use of the vessel will not be described in detail. A common feature of these processes, however, resides in the fact that a particulate material to be treated or processed is introduced to the vessel 20 at the top thereof and flows by gravity through the vessel where it is exposed to a counterflow of treating fluid before it is removed from the bottom of the vessel. Depending upon the process being practiced within the vessel, the particulate material itself will vary as will the treating fluids which may be gas or liquid. Certain gas treating fluids may be combustible to obtain elevated temperatures for the practice of certain processes.

The vessel 20 can be seen in FIGS. 1 and 2 to comprise a vertical and substantially cylindrical wall or shell 22 having an upper feed zone 24, an intermediate treatment zone 26, and a lower removal zone 28. The feed zone includes a feed hopper 30 and a unique lock hopper 32 so that particulate material can be fed to the treatment zone at a desired rate and such that the escape of treating fluids through the feed zone is minimized.

The treatment zone 26 includes a receiving hopper 34 and a material separator 36 disposed beneath the hopper which has been uniquely designed to separate particulate material by physical size and distribute the material in a substantially uniform manner across the transverse cross-section of the vessel. Beneath the separator 36, the particulate material is exposed in the treatment zone 26 to treating fluids which are introduced to the vessel through a unique system of distributor pipes 38 and an exhaust port 40 is positioned above the separator to remove the treatinq fluids from the vessel 20.

The removal zone 28 includes a removal grate 42 which is designed to remove the material in a substantially uniform manner across the cross-section of the vessel 20, again to encourage the uniform flow of particulate material through the vessel for uniform treatment by the treating fluids. The removal grate 42 in the removal zone 28 has been uniquely designed to introduce treating fluids, which may be cooling fluids, so that particulate material which may have been heat treated is cooled before being removed from the vessel. In the disclosed embodiment, a separate lock hopper 44 is disposed beneath the removal grate 42 in the removal zone 28 so that charges of material can be removed from the vessel without a significant loss of treating fluids. The lower lock hopper 44 is an optional item and may or may not be desired, depending upon the process for which the vessel is being used.

With reference to FIGS. 1 through 6, the feed zone 24 in the vessel 20 can be seen to be of slightly narrower cross-section than that of the treatment zone 26 but is cylindrical in cross-section like the treatment zone. The feed hopper 30 is disposed at the top of the vessel in alignment with the discharge end of a feed conveyor 46, so as to receive particulate material to be processed at a controllable rate. A circular discharge opening 48 at the bottom of the feed hopper 30 is centered on the central longitudinal axis of the vessel and is thereby positioned to deposit particulate material into the underlying lock hopper 32 along the central vertical axis. The lock hopper 32 also has a central discharge opening 50 positioned along the longitudinal axis of the vessel and is designed to deposit charges of particulate material into the receiving hopper 34 in predetermined quantities. The flow of material from the feed hopper 30 to the lock hopper 32 and from the lock hopper to the receiving hopper 34 is controlled by uniquely designed slide gates 52a and 52b, respectively, which are disposed horizontally and adapted to operate in any sequential manner to obtain the desired flow of particulate material through the feed zone 24 and into the treatment zone 26 and, in certain processes, in a manner to inhibit the release of treating fluids through the feed zone.

Since the slide gates 52a and 52b associated with both the feed hopper 30 and the lock hopper 32 are identical, only the gate associated with the feed hopper will be described. As can probably best be seen in FIGS. 5 and 6, the discharge opening 48 from the feed hopper has a ring housing 54 around its lower peripheral edge with an inwardly opening circular recess 56 of square cross-section formed therein to receive a peripheral wear ring 58. A slide plate 60 is disposed horizontally across the vessel 20 beneath the feed hopper 30 and has a circular opening 62 therethrough which is of substantially the same size as the discharge opening 48 from the feed hopper. The opening 62 in the slide plate 60 is disposed at one end thereof, and as can be seen in FIG. 4, the slide plate is of substantially rectangular configuration and is slidable in a horizontal plane so that the circular opening 62 can be selectively aligned or misaligned with the discharge opening 48 from the feed hopper 30. When the circular opening 62 is aligned with the discharge opening 48 from the feed hopper 30, particulate material in the feed zone 24 is free to flow past the slide gate 52a, but when the opening 62 in the slide plate 60 is misaligned with the discharge opening 48, the material in the feed hopper is seated upon the portion of the slide plate that has no opening so that particulate material is retained in the hopper.

For purposes of description, an open condition of the slide gate 52a is defined as being when the circular opening 62 in the slide plate 60 is aligned with the discharge opening 48 in the feed hopper 30, and a closed position is defined as being when there is no communication between the discharge opening in the feed hopper and the circular opening through the slide plate. A double-acting power cylinder 64, which can be pneumatic or hydraulic, is rigidly mounted in the substantially cylindrical wall 22 of the vessel in alignment with the slide plate 60 and has a piston rod 66 projecting through the wall 22 so as to be connected to an end edge 68 of the slide plate 60 by a clevis-type connection 70. Accordingly, activation of the power cylinder 64 in either an extension or retraction direction causes the slide plate 60 to move between its open and closed positions.

With particular reference to FIG. 6, the slide plate 60 is adapted to slide on two parallel and spaced glide rails 72 which are in turn supported on a support rail 74 that is anchored in any conventional manner to the cylindrical wall 22. The support rail 74 is of inverted L-shaped cross-section, thereby providing a horizontal leg 76 that supports an associated glide rail 72. Spaced support brackets 78 of L-shaped cross-section are welded to the underside of the horizontal leg 76 of the support rail and have vertical guide legs 80 extending upwardly in overlapping relationship with the opposite side edges 82 of the slide plate 60. The support brackets 78 are spaced along the length of the glide rail 72 for a reason to be explained hereafter.

The slide plate 60 is preferably made of a hardened steel material as is the peripheral wear ring 58, but the slide plate is positioned relative to the wear ring so as to provide a very small spacing therebetween. The spacing can be adjusted to accommodate wear by a set screw 84 that is threaded through the horizontal leg 76 of the support rail 74 and into engaging relationship with the overlying glide rail 72. There are a plurality of such set screws along the length of each support rail so that desired elevational adjustments can be made to the glide rail along its length.

As will be appreciated, as the slide plate 60 is moved between its open and closed positions to permit particulate material to pass from the feed hopper 30 to the lock hopper 32, certain fine dust forming part of the particulate material may be allowed to pass between the wear ring 58 and the upper surface of the slide plate. Due to the fact that the support brackets 78 are spaced along the length of the glide rail 72, any such dust-like material is allowed to pass between the support brackets and fall beneath the brackets where it will not cause problems in wear between the glide rail and the slide plate which is supported thereon. As can be appreciated in FIG. 6, there is a slight spacing between the vertical guide leg 80 of the support brackets 78 and the opposite side edges 82 of the slide plate 60, but any dust-like material falling into this space will ultimately drop off the sides of the support brackets after dropping downwardly onto the top surface of the horizontal leg 76 of the support rails 74.

The slide gates 52a and 52b of the feed hopper 30 and the lock hopper 32, respectively, are independently operable so that material fed to the feed hopper by the feed conveyor 46 can be temporarily detained in the feed hopper before the feed hopper slide gate 52a is opened to deposit the material into the lock hopper. In most uses of the vessel 20, the lock hopper slide gate 52b would remain closed to accumulate a charge of particulate material in the lock hopper before the feed hopper slide gate is again closed so that a new charge of material can be accumulated in the feed hopper. After the feed hopper gate 52a is closed, the lock hopper gate 52b can be opened to deposit the material therein into the receiving hopper 34 therebeneath, and as will be appreciated, any treating fluids that may be in the treating portion of the vessel are thereby inhibited from being released from the vessel through the feed zone 24 due to the fact that the slide gates 52a and 52b can be operated so that they are never open at the same time.

The receiving hopper 34 as seen in FIG. 2 has a lower inverted frusto-conical side wall 86 which converges downwardly to channel the particulate material toward a cylindrical discharge wall or area 88 of the receiving hopper 34 which is coaxial with the central longitudinal axis of the vessel 20.

Immediately beneath the discharge area 88 of the receiving hopper 34 a substantially conically-shaped separator 36 is mounted by suspension from the receiving hopper and disposed to receive particulate material flowing from the discharge area and disperse that material in a manner such that large and small particles are desirably separated and distributed across the cross-section of the vessel. The separator 36 is best illustrated in FIGS. 2 and 7 through 9, wherein it will be seen that the separator has its apex at an elevation substantially coplanar with the opening from the discharge area 88 of the receiving hopper 34. The separator has a conical downwardly divergent wall 90 having circumferentially spaced and alternating long and short radial slots 92 and 94, respectively, therein. Both the long and short slots open through the lower peripheral edge 96 of the conical wall 90 and have downwardly divergent side edges 98 for a purpose to be described hereafter. Immediately above each slot in the conical wall are barriers 100 which take the form of either a hollow tubular fluid by-pass member 102 or a raised vertical barrier plate 104 of L-shaped cross-section. The barrier plates 104 are disposed immediately above each of the long slots 92 and extend vertically so that the side legs 106, FIG. 9, of the plates diverge away from the apex of the conical wall 90. The plate-like barriers 104 have a total lateral dimension substantially equivalent to that of the width of the top of a long slot 92. The tubular fluid by-pass members 102 have a diameter that is substantially the same as the width of the top of a short slot 94 and form an open channel from an area beneath the separator 36 to an area above the separator. The tubular fluid by-pass members 102 are secured by welding or the like to the cylindrical discharge 88 of the receiving hopper 34 to suspend the separator at a centered location in the vessel.

Particulate material passing from the receiving hopper 34 onto the separator 36 is distributed onto the conical wall 90 of the separator and flows outwardly therefrom since the lower peripheral edge 96 of the separator forms a segmented circle which is substantially larger than the diameter of the cylindrical discharge area 88 of the receiving hopper. A well-known phenomenon of flow patterns of particulate material through a vertical cylindrical vessel is that larger particles tend to migrate toward the side walls of the vertical vessel while smaller particulate matter congregates in the center of the vessel. It is also well-known that treating fluids, be they liquid or gas, will move more freely through larger particulate materials than through smaller particulate material since the interstitial spaces between larger particles is greater than the interstitial spaces between smaller particles. Accordingly, there is more resistance to fluid flow through smaller particles than larger particles, and if larger and smaller particles are not uniformly distributed across the cross-section of a treating vessel of the type described herein, the exposure of the particulate material to treating fluids will not be uniform. In other words, if the material were allowed to pass according to known particle flow patterns, the larger particles would migrate toward the outer cylindrical wall of the vessel as the particulate material flows through the vessel with the smaller particles congregating in the center and treating fluids would tend to channel along the cylindrical walls where there is less resistance to flow. The material separator 36 utilized in the vessel of the present invention has been uniquely designed to encourage smaller granular material to migrate radially outwardly toward the cylindrical wall 22 and to encourage the larger particles to drop and move through the center of the cylinder. In this manner, it has been found that a fairly uniform cross-section of large and small particles is established thereby encouraging a uniform treatment of the materials by the counterflowing treating fluids.

As can be appreciated by reference to the flow arrows in FIGS. 7 and 9, material deposited at the apex of the conical wall 90 flows downwardly across the conical wall with the smaller particles being diverted by the barriers 100 away from the slots 92 and 94, thereby encouraging this material to pass across the conical wall and be deposited from the peripheral edge 96 which is near the side wall of the vessel shell. Some of the small particles will, of course, drop across the side edges 98 of the slots, but much of the material will pass radially outwardly towards the side walls of the vessel. Larger particles which are typically deposited onto the separator 36 from near the sides of the cylindrical wall 88 of the receiving hopper 34 may completely bypass the plate-like barrier means 104 as is possibly more evident by reference to FIG. 9, and some of these particles will drop into the long slots 92 so as to drop beneath the conical wall 90 of the separator and nearer to the center of the vessel. Since the side edges 98 of the long and short slots 92 and 94, respectively, are downwardly divergent, some particles will pass through an upper portion of the slot, but larger particles which possibly do not fit through the narrower portions of the slot will move down the slot and be deposited beneath the separator once the slot is wide enough to accept such passage.

It will be appreciated from the above that the particulate material moving downwardly through the vessel by gravity is encouraged to flow across the separator 36 in varied flow patterns at least partially dependent upon the particle size so that smaller particles are encouraged to move toward the vessel wall with the larger particles being allowed to drop beneath the separator more toward the center of the vessel so as to force a separation which is opposite to what happens naturally in the flow of particulate material. The tubular fluid by-pass members 102 permit treating fluids which are rising upwardly in a counterflow manner to pass beyond the separator 36 and into an annular colleotion zone 108 from where the fluids can be removed from the vessel through the exhaust port 40 provided in the wall of the vessel in approximate horizontal alignment with the discharge area 88 of the receiving hopper 34. Treating fluids, of course, are also allowed to flow upwardly through the long and short slots 92 and 94, respectively, as well as around the lower peripheral edge 96 of the conical wall 90 and into the collection zone 108, even though there is less resistance to the flow of such fluids through the tubular bypass members 102 since the other flow paths for such fluid are through particulate material which is passing across the conical wall.

With reference to FIG. 2, the portion of the treating zone 26 beneath the separator 36 is lined with refractory material 110 such as brick which can absorb extremely high-treating temperatures in excess of 2,000° F. when certain processes are performed in the vessel. The brick lining, of course, protects the outer cylindrical metal shell 22 of the vessel from such extreme heat.

At an intermediate location between the material separator 36 and the removal grate 42 but in the treatment zone 26 there are a plurality of treating fluid distributor pipes 38 designed to introduce desirable treating fluids into the particulate material consistent with the objects of the process being practiced in the vessel. There are a plurality of horizontal linear pipes 38L disposed in two vertically spaced planes and extending along chords of the vessel, and there are also two arcuate distributor pipes 38A seated in arcuate recesses of the refractory lining 110.

There are three lower linear distributor pipes 38L, FIGS. 8 and 11, which extend along chords of the vessel with the center pipe extending along a diameter of the vessel. The pipes have delivery ports 112 spaced along their length within the interior of the vessel and opening from opposite sides of the pipes in a slightly downwardly directed orientation so that particulate material flowing through the vessel is not encouraged to flow into one of the divergent ports. Fluid is introduced to the linear pipes 38L in any convenient manner through each end 114 so that all treating fluid introduced to a pipe is delivered to the interior of the vessel through a delivery port. There are two upper linear pipes 38L with the upper pipes extending along chords of the vessel and at a location that is vertically intermediate to the lower linear distributor pipes. The two upper pipes have delivery ports 112 distributed along their length on opposite sides identical to the lower linear pipes 38L.

The arcuate distributor pipes 38A are partially embedded in arcuate recesses 118 in the refractory lining 110 of the vessel 20 as mentioned previously so that they are supported in the recesses and face inwardly into the vessel. In the disclosed embodiment of the arcuate pipes 38A, they include concentric tubular elements with the center element 120 having a plurality of discharge ports 122 with divergent sides 124 spaced along their length and directed into the interior of the vessel. A space is defined between the inner and an outer tubular element 126 through which cooling fluids and the like are permitted to pass. It should be pointed out that a similar arranqement of inner and outer elements may be provided in the linear distributor pipes 38L as well. Inlet and outlet ports 128 for the cooling fluids are provided in the outer element so as to be in communication with the space between the inner and outer elements 120 and 126, respectively.

As can be seen in FIGS. 10 and 13, there are two treating fluid inlets 130 to the arcuate pipes 38A that are in communication with the inner element 120. A vertically oriented and arcuate baffle 132 is mounted in the interior of the inner element in alignment with each inlet 130 so that fluid being introduced to an arcuate pipe is diverted (FIG. 13) by the baffle so as to prevent short-circuiting of the treating fluids from an inlet pipe to a discharge port 122 that is closely adjacent thereto. The baffles 132 have small openings 134 therein so that some of the fluid being introduced to the arcuate pipe will pass through the baffle, but the majority will be diverted to flow in opposite directions along the length of the inner element for uniform flow through the delivery ports along the length of the arcuate distributor pipes.

It can be seen from the arrangement of the fluid distributor pipes 38 that a fairly uniform introduction of treating fluid is made across the cross-section of the vessel to uniformly treat the particulate material flowing downwardly through the vessel which, as was mentioned previously, has also been uniformly distributed to provide a uniform cross-section of large and small particulate material. Since the treating fluid exhaust port 40 from the vessel is positioned in an upper portion of the treating zone 26, the treating fluids which are introduced to the vessel through the distributor pipes flow upwardly in a counterflow direction to that of the particulate material before being removed from the vessel.

The removal grate 42 is positioned immediately below the treating zone 26 of the vessel and is designed to receive particulate material which has been treated in accordance with a known process and remove the material from the treating zone in a uniform transverse flow pattern so as to encourage a uniform transverse flow of the material through the treating zone. The removal grate 42 is also uniquely designed to introduce cooling or treating fluids in a uniform transverse cross-sectional manner so that the material being removed from the vessel can be radically cooled even though the treating process was under extremely high temperatures.

The removal grate 42 is seen best in FIGS. 2 and 14 through 19 and with reference to FIGS. 14 and 16, it can be seen to include a bottom plate 136 that is disposed horizontally and supported by cross-beams 138 which are in turn supported by the vessel wall. The bottom plate has a circular opening 140 concentric with the central longitudinal axis of the vessel. A ring-like opening 142 is defined between the outer circumferential edge 144 of the bottom plate and the inner wall of the cylindrical shell 22 so that there are in fact two openings through which treated particulate material can pass.

Particulate material is deposited onto the bottom plate 136 through a circular opening 146 defined between a central downwardly divergent conically shaped deflector 148 and an outer concentric downwardly convergent frusto-conical channeling surface 150. The central conically shaped deflector has an upper cone section 152 and a lower frusto-conical section 154 with the cone section slightly overlapping the frusto-conical section in spaced relationship therewith. At the overlap between the cone section 152 and the frusto-conical section 154, an annular opening 156 is established for a purpose to be described hereafter.

The frusto-conical channeling surface 150 of the grate is defined by upper and lower downwardly convergent frusto-conical sections 158 and 160, respectively, with the upper section slightly overlapping the lower section in spaced relationship therewith and defining an outer annular opening 162 for a purpose to be described later. The upper frusto-conical section 158 is formed from an angular piece of metal having an annular horizontal flange 164 along an outer peripheral edge that is connected to the shell of the vessel immediately beneath the refractory liner 110 and then tapers inwardly in a downwardly convergent manner. The lower frusto-conical section 160 of the channeling surface 150 is three-sided with upper and lower horizontal portions 166 and 168, respectively, and a downwardly convergent frusto-conical intermediate portion 170. The lower frusto-conical section 160, which is also annularly secured to the vessel wall, defines an annular fluid plenum chamber 172 wherein cooling fluid or the like is introduced through an inlet port 174 from the exterior of the vessel into the removal grate 42. Four radial fluid transfer passages 176 extend from the frustoconical intermediate portion 170 of the lower frusto-conical section 160 to the frusto-conical section 154 of the conical deflector 148 and thereby define four passageways which established fluid communication between the fluid plenum chamber 172 and the interior of the conical deflector. The conical deflector has a circular bottom wall 178 to prevent fluid from flowing downwardly out of the deflector. Any fluid passing into the conical deflector from the fluid plenum 172 is allowed to escape from the conical deflector through the annular opening 156 between the upper cone section 152 and the lower frusto-conical section 154. It will, therefore, be seen by reference to FIG. 14 that this fluid is distributed in a relatively small circular pattern concentric with the longitudinal axis of the vessel.

Spaced openings 180 are provided through the upper horizontal portion 166 of the lower frusto-conical section 160 of the channeling surface 150 so that fluid in the fluid plenum chamber 172 is allowed to pass through the openings 180 and downwardly through the outer annular opening 162 in the channeling surface so as to be distributed into the particulate material in a relatively large circular pattern that is also concentric with the central longitudinal axis of the vessel. In this manner, cooling fluids or the like can be distributed through the removal grate 42 in a fairly uniform manner so as to interact with the particulate material as it flows through the grate.

The radial fluid transfer passages 176 are structurally strong and support the conical deflector 148. Each radial fluid transfer passage has a tapered and downwardly divergent upper wall 182 so as not to impose a significant impediment to the flow of particulate material through the removal grate 42.

As mentioned previously, the circular opening 146 between the conical deflector 148 and the outer frusto-conical channeling surface 150 through which the particulate material passes is aligned with the ring-like bottom plate 136 so that the particulate material is deposited on the plate. In order to remove this material in a substantially transversely uniform manner from the treatment zone 26, a circular pusher bar 184 is disposed immediately adjacent to the upper surface of the bottom plate 136 and is supported and movable by five single-acting power cylinders 186 which are equally circumferentially spaced around the vessel. The power cylinders are computer controlled and are operative in moving the circular pusher bar 184 in a predetermined pattern to pull particulate material that has been deposited on the ring-like bottom plate 136 into the central circular opening 140 through the plate or push the material outwardly into the ring-like opening 142 between the bottom plate and the vessel wall.

As best seen in FIGS. 17 through 19, the power cylinders 186 are mounted on cylindrical extensions 188 from the vessel shell and include a cylinder housing 190 and a piston rod 192. The cylinder is single acting having a hydraulic port 193. The cylinder housing is pivotally mounted for movement about a vertical pivot axis 194 which is adjacent to its innermost end so that the cylinder and its piston rod can pivot slightly about the vertical axis in order to desirably move the pusher bar 184 as will be described hereafter.

With reference to FIG. 19, which illustrates the manner in which the power cylinders 186 are mounted to the vessel shell, it will be appreciated that a ring mounting block 196 is bolted to the cylindrical extension 188 from the vessel shell with the mounting block having vertically aligned cylindrical passages 198 therein. A cylinder housing pivot head 200 is connected to the innermost end of the cylinder housing 190 by elongated bolts 202, and the pivot head has upper and lower pivot pins 204 disposed on the vertical pivot axis 194 and which are pivotally received in the passages through the ring mounting block 196. The cylinder housing pivot head 200 has an axial passage 206 therethrough which receives a bearing 208 through which the piston rod 192 extends. Through this connection, it will be appreciated that the cylinder 186 is allowed to pivot about the pivot pins 204 which are disposed on the innermost end of the cylinder housing 190, and the piston rod is linearly reciprocal through the bearing 208. A scraping ring 209 is positioned in contiguous relationship with the innermost end of the bearing 208 in surrounding relationship with the piston rod and serves to scrape dust or other particles of material from the piston rod when it is retracted to inhibit the passage of such material out of the vessel. To assist in this regard, a pressurized purge fluid line 211 is provided in fluid communication with a space 213 surrounding the piston rod so that a purging fluid such as air can be injected into the space 213 and forced to flow past the bearing 208 and the scraper ring 209, which are slightly spaced from the piston rod, thereby blowing dust-like material back into the vessel.

The ring mounting block 196 has a radially outwardly ring-like protrusion 210 of substantially Z-shaped cross-section which supports, along its outermost edge, a flexible rubber ring 212 of neoprene or the like which projects radially inwardly from its connection to the protrusion 210. The innermost edge of the flexible rubber ring 212 is attached to a Z-shaped connection bracket 214 which has its opposite end anchored to an annular flange 216 secured to the cylinder housing pivot head 200. The rubber ring 212 establishes a flexible seal between those components of the housing which are rigidly connected to the shell of the vessel and those components which are connected to the pivotable power cylinder 186.

It will therefore be appreciated that any dust or other associated particulate material which may get past the pivotal connection of the cylinder to the vessel will be trapped by the flexible ring and thereby avoid the leakage of any such material or treating fluids from the vessel.

With particular reference to FIG. 18, the piston rod 192 for each power cylinder 186 is connected at its distal end by a clevis 218 to the innermost end of an extension rod 220 so that the rod is free to pivot about a vertical pivot pin 222 through the clevis. The outermost end of the extension rod is similarly connected by a clevis 224 to a bracket 226 on the outer face of the circular pusher bar 184, again permitting pivotal movement about a vertical axis 228 between the outermost end of the extension rod 220 and its connection to the pusher bar. Accordingly, between the power cylinder 186 and the pusher bar 184, there are three vertical pivot axes permitting the pusher bar to move in a desired manner to uniformly push material on the bottom plate 136 into either the circular or the ring-like discharge openings 140 and 142, respectively.

The power cylinders 186 as mentioned previously are computer controlled and can be operated in any sequential manner to effect a desired movement of the pusher bar 184. In the preferred form, the power cylinders are operated so that each point along the ring-shaped pusher bar is moved in an orbital pattern 230 which is actually an equal ten-sided figure as shown in FIG. 18. Thus, the IO pusher bar as a whole is eccentrically moved relative to the central vertical axis of the vessel. By way of example, if the single-acting cylinders 186 are sequentially activated and are powered only in a pulling or retracting mode, a first activated cylinder might receive pressure fluid that begins retracting the piston rod 192 until it reaches a certain specified position which might be, for example, 80 percent of its maximum stroke. At that point in time, a second cylinder which is next adjacent to the first cylinder in a clockwise direction would be activated to begin its power stroke of retracting the piston rod. Once the piston rod of the first cylinder was fully retracted, it would then be deactivated and free to be pulled by other cylinders to extend the piston rod. After the piston rod of the second cylinder was retracted approximately 80 percent of its full stroke, the piston rod of the next adjacent cylinder in a clockwise direction would be activated in a power retracting stroke while the second cylinder completed its stroke and is thereafter free to be pulled by other oylinders in an extending stroke. By following this pattern, it will be appreciated that the pusher bar will be eccentrically moved around the central axis of the bottom plate 136, thereby pulling and simultaneously pushing particulate material on the plate into the central discharge opening 140 in the plate and the ring-like discharge opening 142 around the perimeter of the plate, respectively.

The removal grate 42 has been described for vessels of an intermediate diameter, but it will be appreciated that modification to the grate may be made in accordance with the teachings in U.S. Pat. No. 3,027,147 issued Mar. 27, 1962 if a larger diameter vessel were used wherein multiple concentric ring-like pusher bars are interconnected by radial rib connectors between the pusher bars. It is also contemplated that with vessels of a smaller diameter, the conical deflector 148 might be deleted from the grate as well as the central opening 140 through the bottom plate 136 and a solid vertical cylinder could be used as a pusher bar to replace the ring-like pusher bar 184 disclosed above. The solid cylinder pusher bar would be similarly connected to circumferentially spaced power cylinders for eccentric orbital movement identical to that of the ring-like pusher bar described hereinabove.

Material being discharged from the removal grate 42 in the manner previously described can be received in a discharge hopper (not shown) for removal from the vessel or might be discharged into a removal hopper system 232, FIGS. 2 and 14, similar to the hopper system in the feed zone 24 where there are vertically aligned hoppers 234 and 236 that are separated by identical slide gates 238 to permit the particulate material to be removed in charges and without the leakage of treating or cooling fluids from the vessel. Of course, material falling from the lower end of the removal hopper 236 could be deposited onto a removal conveyor belt 240 as illustrated in FIG. 1.

As mentioned previously, the vertical shaft processor 20 of the present invention can be used in numerous diverse processes which may or may not require each component part described hereinbefore. In other words, the component parts of the afore-described processor can be taken in different combinations and arrangements to suit the needs of a particular process being practiced in the vessel.

It will also be appreciated from the afore-described description that particulate material being treated in the vessel is encouraged to flow in a uniform cross-sectional manner through the vessel with a substantially homogeneous mixture of large and small particles for optimal treatment thereof. Similarly, the treating fluids, be they liquid or gas, are introduced to the vessel in a substantially uniform cross-sectional manner so as to be exposed to the particulate material in a uniform cross-sectional manner. Care has been taken to not only introduce the particulate material to the treatment zone 26 in a uniform cross-sectional manner in opposition to the natural flow patterns that such material might otherwise take, but also to remove the material from the vessel in a uniform cross-sectional manner so as not to encourage a non-uniform flow of the material through the treatment zone. The material can also be cooled with the unique removal grate 42 of the processor so as to be ready for handling upon discharge even though it may have been treated at extremely high temperatures in the vessel.

Although the present invention has been described with a certain degree of particularity, it is understood that the present disclosure has been made by way of example, and changes in detail or structure may be made without departing from the spirit of the invention, as defined in the appended claims.

What is claimed is:

1. A vertical shaft processor comprising in combination a substantially cylindrical shell having a central vertical longitudinal axis and an exhaust port in an upper portion thereof, feed means at the top of said shell for introducing particulate material to the shell that is to flow by gravity therethrough and be treated by fluids therein, said feed means including gate means to inhibit the release of fluids while permitting said particulate material to flow by gravity through said shell, a material separator mounted in said shell beneath said feed means to receive particulate material from said feed means, said material separator having a downwardly divergent wall onto which said particulate material is deposited, said wall having slots formed therein and a peripheral edge so that some particulate material can pass through said slots and drop beneath said separator while other particulate material can pass over said peripheral edge and drop to the side of said material separator, and removal grate means forming a lower wall of said shell, said removal grate means including a horizontal bottom plate having a circular discharge opening therethrough and defining a concentric ring shaped discharge opening, a closed loop pusher bar disposed in adjacent relationship with the top surface of said bottom plate, a plurality of power cylinders disposed in oircumferentially spaced relationship around said pusher bar, said power cylinders including piston rods connected to said pusher bar such that predetermined sequential operation of said power cylinders causes each point along the periphery of said pusher bar to move in an orbital path whereby particulate matter deposited onto said bottom plate can be pushed in a predictable flow pattern into said circular and ring-shaped discharge openings, and fluid entry means in said removal grate for introducing treating fluids to the interior of said shell.

2. The processor of claim 1 further including a fluid distribution system mounted in said shell, said distribution system including a plurality of linear distributor pipes extending across said shell and having spaced openings therein, said linear distributor pipes being positioned between said material separator and said removal grate, and at least two arcuate distributor pipes having longitudinally spaced openings therein, said arcuate pipes being positioned adjacent to said shell whereby treating fluids can be introduced to said particulate material through said linear and arcuate distributor pipes and can be removed from said shell through said exhaust port.

3. The processor of claim 1 wherein said feed means includes a feed hopper at the top of said shell into which said particulate material is introduced to said shell and a lock hopper immediately beneath said feed hopper, each of said feed hopper and lock hopper having a discharge opening centered on said central vertical axis at the bottom thereof, said discharge openings being surrounded by a peripheral edge of the associated hopper, each of said feed hopper and lock hopper having a slide gate to selectively open and close the associated discharge opening, said slide gates including a laterally slidable plate having opposite side edges and an opening therethrough which is selectively alignable with the associated discharge opening of a hopper to selectively permit particulate material to flow through said discharge opening, a peripheral wear ring along said peripheral edge, said wear ring being positioned in close proximity to the top surface of said slidable plate, a pair of flat elongated glide rails slidably supporting said opposite side edges, a plurality of spaced support brackets supporting said glide rails, said support brackets extending beneath said glide rails and upwardly along the sides of the glide rails and the side edges of the slidable plate whereby particulate matter that passes beneath said wear ring on the top surface of the slidable plate can drop from the side edges of the slidable plate, and power means operatively connected to said slidable plate to reciprocally move the slidable plate between open and closed positions wherein the opening in the slidable plate is aligned with and non-aligned with the associated discharge opening respectively.

4. The processor of claim 3 further including support rails operatively mounted on said shell and positioned between said brackets and said glide rails.

5. The processor of claim 4 further including vertically adjustable means along said support rails and in operative engagement with the bottom of said glide rails whereby the elevation of the slidable plate can be adjusted to accommodate wear by elevating the glide rails on which the slidable plate is supported relative to the support rails.

6. The processor of claim 5 wherein said adjustment means are set screws threadedly seated in said support rail.

7. The processor of claim 1 wherein said downwardly divergent wall defines a substantially conical surface and said slots have downwardly divergent sides.

8. The processor of claim 7 further including barrier means on said separator forming a raised protuberance over said divergent wall, said barrier means being positioned immediately adjacent to the uppermost extent of said slots.

9. The processor of claim 8 wherein at least some of said barrier means comprise a plate-like protrusion adapted to divert the flow of relatively small particles of particulate matter.

10. The processor of claim 9 wherein said plate-like protrusion comprises a protrusion of L-shaped cross-section having two sides and with said sides diverging away from the apex of the conical surface.

11. The processor of claim 9 further including tubular members opening through and extending upwardly from said conical surface so as to provide a passageway for treating fluids to move through said separator.

12. The processor of claim 11 wherein said tubular members constitute a portion of said barrier means.

13. The processor of claim 1 wherein said removal grate further includes a substantially conically shaped deflector having a circular lower edge and an axis of generation coaxial with the central vertical longitudinal axis of the shell, the lower edge of said deflector being spaced above said bottom plate, a substantially frusto-conical downwardly convergent channeling surface surrounding said deflector in spaced relationship therewith having its lower edge spaced above said bottom plate thereby defining a ring-like opening between said deflector and the channeling surface through which said particulate material can flow onto the bottom plate, and wherein said pusher bar is disposed in vertical alignment with said ring-like opening.

14. The processor of claim 13 wherein said deflector has a downwardly divergent cone section coaxial with and vertically overlapping an underlying frusto-conical, downwardly divergent section, an annular opening between said sections and further including first fluid inlet means for delivering treating fluid to the interior of said sections whereby said treating fluid can flow through said annular opening and into contact with said particulate material.

15. The processor of claim 13 wherein said channeling surface includes two overlapping downwardly convergent frusto-conical sections defining an outer annular opening therebetween, and further including outer fluid inlet means for delivering treating fluid to the interior of said downwardly convergent frusto-conical sections whereby said treating fluid can flow through said outer annular opening and into contact with said particulate material.

16. The processor of claim 14 wherein said channeling surface includes two overlapping downwardly convergent frusto-conical sections defining an outer annular opening therebetween and further including outer fluid inlet means for delivering treating fluid to the interior of said downwardly convergent frusto-conical sections whereby said treating fluid can flow through said outer annular opening and into contact with said particulate material.

17. The processor of claim 13 wherein said power cylinders are pivotally mounted for movement about a vertical pivot axis.

18. The processor of claim 17 wherein said power cylinders have a cylinder body and said piston rod protrudes from an innermost end of said cylinder body, and wherein said pivot axis is ad3acent to said innermost end.

19. The processor of claim 2 wherein said linear distribution pipes have fluid delivery ports along opposite sides thereof and said arcuate distributor pipes have fluid delivery ports along one side opening into the interior of said shell.

20. The processor of claim 19 wherein said shell has diametrically opposed grooves in an internal wall thereof and said arcuate pipes are seated in said grooves.

21. The processor of claim 19 wherein each arcuate distributor pipe has a fluid inlet port and a vertical baffle positioned interiorly of said arcuate distributor pipe in alignment with said fluid inlet port to divert the flow of fluid into said arcuate pipe along the length of said arcuate pipe.

22. The processor of claim 1 further including hopper means beneath said removal grate means to receive particulate material passing through said removal grate means, said hopper means including second gate means to inhibit the release of fluids from said shell while permitting the flow by gravity of said particulate material through the hopper means.

23. The processor of claim 22 wherein said hopper means includes a receptacle into which said particulate material can flow and wherein said second gate means includes an independently movable qate above and belo said reoeptacle.

24. In a vertical shaft processor including a substantially cylindrical shell having a central vertical longitudinal axis and an exhaust port in an upper portion thereof, said processor including feed means at the top thereof for introducing particulate material to the shell to be treated by a counterflow of treating fluids wherein the improvement comprises:
feed means including a feed hopper at the top of said shell into which said particulate material is introduced to said shell and a lock hopper immediately beneath said feed hopper each of said feed hopper and lock hopper having a discharge opening centered on said central vertical axis at the bottom thereof, said discharge openings being surrounded by a peripheral edge of the associate hopper, each of said feed hopper and lock hopper having a slide gate to selectively open and close said discharge openings, said slide gates including a laterally slidable plate having opposite side edges and an opening therethrough which is selectively alignable with the associated discharge opening to selectively permit particulate material to flow through said discharge opening, a peripheral wear ring along said peripheral edge, said wear ring being positioned in close proximity to the top surface of said slidable plate, a pair of flat elongated glide rails slidably supporting said opposite side edges, a plurality of spaced support brackets supporting said glide rails, said support brackets extending beneath said glide rails and upwardly along the sides of the glide rails and the side edges of the slidable plate whereby particulate matter that passes beneath said wear ring on the top surface of the slidable plate can drop from the side edges of the slidable plate, and power means operatively connected to said slidable plate to reciprocally move the slidable plate between open and close positions wherein the opening in the slidable plate is aligned with and non-aligned with the associated discharge opening respectively.

25. The processor of claim 24 further including support rails operatively mounted on said shell and positioned between said brackets and said glide rails.

26. The processor of claim 25 further including vertically adjustable means along said support rails and in operative engagement with the bottom of said glide rails whereby the elevation of the slidable plate can be adjusted to accommodate wear by elevating the glide rails on which the slidable plate is supported relative to the support rails.

27. The processor of claim 26 wherein said adjustment means are set screws threadedly seated in said support rail.

28. In a vertical shaft processor having a substantially cylindrical shell with a central vertical longitudinal axis, an exhaust port in an upper portion thereof and feed means at the top of said shell for introducing particulate material to the shell that is to be treated therein, wherein the improvement comprises:
a material separator mounted in said shell beneath said feed means to receive particulate material from said feed means, said material separator having a downwardly divergent wall onto which said particulate, material is deposited, said wall ahving a peripheral lower edge and slots formed therein, said slots opening through said peripheral edge so that some particular material can pass through said slots and drop beneath said separator while other particulate material can pass over said peripheral edge and drop to the side of said material separator.

29. The processor of claim 28 wherein said downwardly divergent wall is substantially conical in configuration and said slots have downwardly divergent sides.

30. The processor of claim 29 further including barrier means on said separator forming a raised protuberance over said divergent wall, said barrier means being positioned immediately adjacent to the uppermost extent of said slots.

31. The processor of claim 30 wherein at least some of said barrier means comprise a plate-like protrusion adapted to divert the flow of relatively small particles of particulate matter.

32. In a vertical shaft processor comprising in combination a substantially cylindrical shell having a central vertical longitudinal axis, an exhaust port in an upper portion thereof and feed means at the top of said shell for introducing particulate material to the shell that is to be treated therein, wherein the improvement comprises:
a removal grate means forming a lower wall of said shell, said removal grate means including a bottom horizontal plate having a circular opening therethrough and a concentric ring-shaped opening therearound, a closed loop pusher bar disposed in adjacent relationship with the top surface of said bottom plate, a plurality of power cylinders disposed in circumferentially spaced relationship around said pusher bar, said power cylinders including piston rods connected to said pusher bar such that predetermined sequential operation of said power cylinders causes each point along the periphery of said pusher bar to move in an orbital path whereby particulate material deposited onto said bottom plate can be pushed in a predictable flow pattern into said circular and ring-shaped openings, and fluid entry means in said removal grate for introducing treating fluids to the interior of said shell.

33. The processor of claim 32 wherein said removal grate further includes a substantially conically-shaped downwardly divergent deflector having a circular lower edge and an axis of generation coaxial with the central vertical longitudinal axis of the shell, the lower edge of said deflector being spaced above said bottom plate, a downwardly convergent substantially frustoconical channeling surface surrounding said deflector in spaced relationship therewith having a lower edge spaced above said bottom plate thereby defining a ring-like opening between said deflected surface and channeling surface through which said particulate material can flow onto the bottom plate, and wherein said pusher bar is disposed in alignment with said ring-like opening.

34. The processor of claim 33 wherein said deflector has a downwardly divergent cone section coaxial and vertically overlapping an underlying downwardly divergent frusto-conical section, an annular opening between said sections and further including fluid inlet means for delivering treating fluid to the interior of said sections whereby said treating fluid can flow through said annular opening and into contact with said particulate material.

35. The processor of claim 33 wherein said channeling surface includes two overlapping downwardly convergent frusto-conical sections defining an outer annular opening therebetween and further including outer fluid inlet means for delivering treating fluid to the interior of said downwardly convergent frusto-conical sections whereby said treating fluid can flow through said outer annular opening and into contact with said particular material.

36. The processor of claim 34 wherein said channeling surface includes two overlapping downwardly convergent frusto-conical sections defining an outer annular opening therebetween and further including outer fluid inlet means for delivering treating fluid to the interior of said downwardly convergent frusto-conical sections whereby said treating fluid can flow through said outer annular opening and into contact with said particulate material.

37. The processor of claim 33 wherein said power cylinders are pivotally mounted for movement about a vertical pivot axis.

38. The processor of claim 37 wherein said power cylinders have a cylinder body and said piston rod protrudes from an innermost end of said cylinder body, and wherein said pivot axis is adjacent to said innermost end.

39. In a vertical shaft processor including a substantially cylindrical shell having a central vertical longitudinal axis, an exhaust port in an upper portion thereof, feed means at the top of said shell for introducing particulate material to the shell that is to be treated therein, removal grate means forming a lower wall of said shell, said removal grate means including a horizontal bottom plate having an opening therein for removal of said particulate material and means for introducing treating fluids to the interior of said shell, wherein the improvement comprises, a fluid distribution system mounted in said shell, said distribution system including a plurality of linear distributor pipes having spaced openings therein extending across said shell and vertically spaced between said feed means and said removal grate, and at least two arcuate distributor pipes having longitudinally spaced openings therein, said arcuate pipes being positioned adjacent to said shell whereby treating fluids can be introduced to said particulate material through said distributor pipes and can be removed from said shell through said exhaust port.

40. In the processor of claim 39, wherein said linear distributor pipes have fluid delivery ports along opposite sides thereof and said arcuate distributor pipes have fluid delivery ports along one side and opening into the interior of said shell.

41. The processor of claim 40, wherein said shell has diametrically opposed grooves and said arcuate pipes are seated in said grooves.

42. The processor of claim 40, wherein each of said arcuate distributor pipes has a fluid inlet port and a vertical baffle positioned interiorly of said arcuate distributor pipe in alignment with said fluid inlet port to divert the flow of fluid into said arcuate pipes along the length of said arcuate pipes.

43. The process of cliam 42, wherein said baffle further includes a plurality of openings therethrough to permit minor portions of said fluid to flow through said baffle.

44. In a vertical shaft processor including a substantially cylindrical shell having an exhaust port in an upper portion thereof, feed means for introducing particulate material to the shell to be treated by a counter-flow of treating fluids and a removal grate through which particulate materila can pass after having been treated, wherein the improvement comprises, hopper means beneath said removal grate to receive particulate material passing through said removal greate, said hopper means including gate means to inhibit the release of fluids from said shell while permitting the flow by gravity of said particulate material through the hopper means, said hopper means having a discharge opening with a peripheral edge and said gate means including a slide gate to selectively open and close said discharge opening,s aid slide gate including a laterally slidable plate having opposite side edges and an opening therethrough which is selectively alignable with said discharge opening to selectively permit particulate material to flow through said discharge opening, a peripheral wear ring along said peripheral edge, said wear ring being positioned in close proximity to the top surface of said slidable plate, a pair of flat elongated glide rails slidably supporting said opposite side edges, a plurality of spaced support brackets upporting said glide rails, said support brackets extending beneath said glide rails and upwardly along the sides of the glide rails and the side edges of the slidable plate whereby particulate matter that passes beneath said wear ring on the top surface of the slidable plate can drop from the side edges of the slidable plate, and power means operatively connected to said slidable plate to reciprocally move the slidable plate between open and closed positions wherein the opening in the slidable plate is aligned with and non-aligned with the associated discharge opening, respectively.

45. In the processor of claim 44, wherein said hopper means includes a receptacle into which said particulate material can flow and wherein said gate means includes an independently movable gate above and below said receptacle.

46. In a vertical shaft processor having a substantially cylindrical shell with a central vertical longitudinal axis, an exhaust port in an upper portion thereof and feed means at the top of said shell for introducing particulate material to the shell that is to be treated therein, wherein the improvement comprises:

a material separator mounted in said shell beneath said feed means to receive particulate material from said feed means, said material separator having a substantially conical downwardly divergent wall onto which said particular material is deposited, said wall having slots with downwardly divergent sides formed therein and a peripheral edge so that soem particular material can pass through said slots and drop beneath said separator whiel otehr particulate material can apss over said peripheral edge and drop to the side of said material separator, barrier means on said separator forming a raised protuberance over said divergent wall, said barrier means being positioned immediately adjacent to the upper most extent of said slots, some of said barrier means comprising a plate-like protrusion of L-shaped cross-section having two sides and with said sides diverging away from the apex of the substantially conical surface, said barrier means being adapted to divert the flow of relatively small particles of particulate matter.

47. In a vertical shaft processor having a substantially cylindrical shell with a central vertical longitudinal axis, an exhaust port in an upper portion thereof and feed means at the top of said shell for introducing particulate material to teh shell that is to be treated therein, wherein the improvement comprises:

a material separator mounted in said shell beneath said feed means to receive particulate material from said feed means, said material separator having a substantially conical downwardly divergent wall onto which said particulate material is deposited, said wall having slots with downwardly divergent sides formed therein and a peripheral edge so that some particulate material can pass through said slots and drop beneath said separator while other particulate material can pass over said peripheral edge and drop to the side of said material separator, barrier means on said separator forming a raised protuberance over said divergent wall, said barrier means being positioned immediately adjacent to the upper most extent of said slots, some of said barrier means comprising a plate-like protrusion adapted to divert the flow of relatively small particles of particulate matter and tubular members opening through and extending upwardly from said conical surface so as to provide a passageway for treating fluids to move through said separator.

48. The processor of claim 47 wherein said tubular members constitute a portion of said barrier means.

* * * * *